Sept. 8, 1936.　　　　　D. E. AUSTIN　　　　　2,053,547

BAGGAGE DOOR LOCK

Filed Oct. 9, 1935

Inventor
Dwight E. Austin

By Blackmore, Spencer & Flint
Attorneys

Patented Sept. 8, 1936

2,053,547

UNITED STATES PATENT OFFICE 2,053,547

BAGGAGE DOOR LOCK

Dwight E. Austin, Pontiac, Mich., assignor to General Motors Truck Corporation, Pontiac, Mich., a corporation of Delaware Application October 9, 1935, Serial No. 44,169

3 Claims. (Cl. 70—14)

This invention relates to motor vehicle body construction and more particularly to an improved closure retainer for the loading opening in the body side wall leading to the baggage compartment under the floor of the passenger space.

An object of the invention is to provide a sturdily constructed mechanism, which comprises only a few simple parts for manufacture at small cost with no more than ordinary precision, and which is capable of exerting a powerful closing force and securely holding the door closed, so that the door combines with the body side wall to impart strenth to the whole, seals the interior against the entrance of dust and moisture and lies in a vertical plane of the body side wall to afford pleasing and smooth appearance without outwardly projecting handles or the like.

Figure 1:
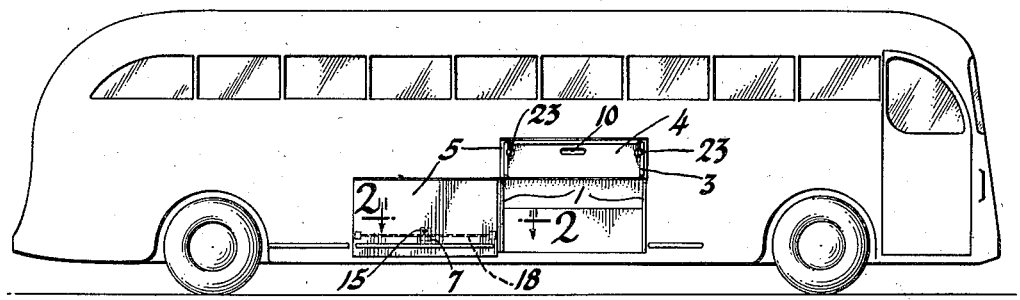
Figure 2:
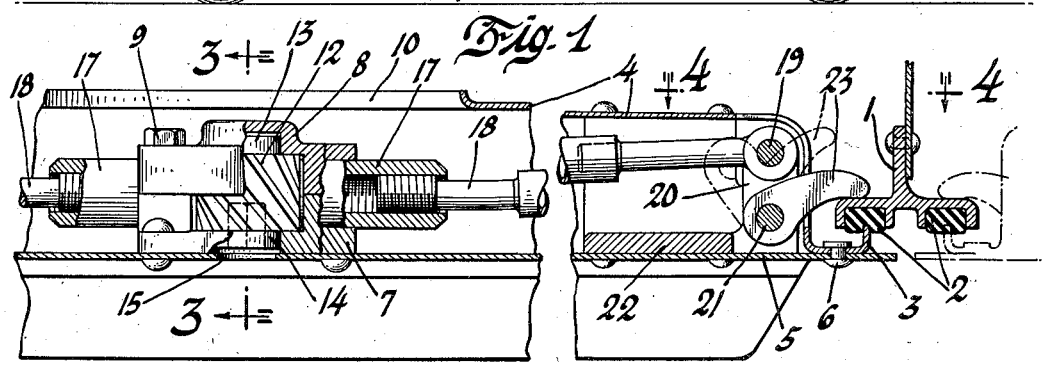
Figure 3:
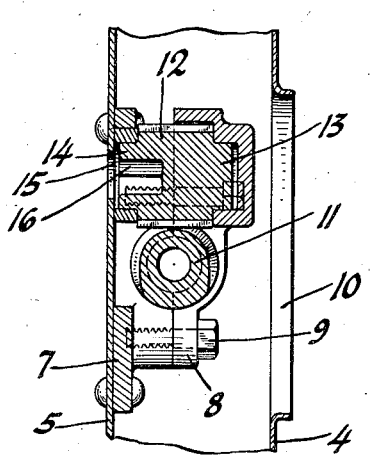
Figure 4:
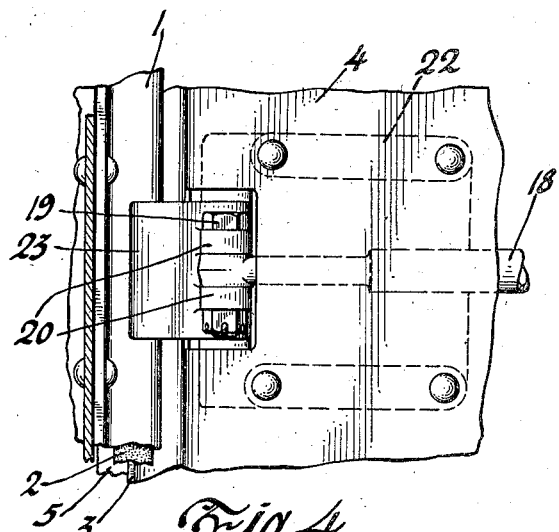

The invention will be best understood upon reference to the accompanying drawing wherein Figure 1 is a side elevation showing a vehicle to which the invention has been applied; Figure 2 is an enlarged horizontal sectional view taken on line 2—2 of Figure 1; Figure 3 is a transverse section taken on line 3—3 of Figure 2 and Figure 4 shows in elevation a fragment of the latch as viewed in the direction of the arrows on line 4—4 of Figure 2.

The invention is shown in the drawing as applied to a passenger coach of a type recently introduced and provided with a row of passenger seats along each side wall and mounted on a floor which extends above the tops of the wheel housings with a depressed central corridor leading thereto from the loading platform adjacent the driver's position at the front of the vehicle. The space beneath the passenger compartment and between the front and rear wheels is utilized for the storage of handgrips, trunks or other luggage. To afford access to the baggage compartment each side wall is provided with a large loading opening which preferably is closed by a pair of vertically swinging hinged doors arranged side by side.

Vertical body posts are located at each side and at the middle of the opening and provide for the convenient fastening of the closed doors thereto. Each post is provided on its front face with a channel to receive a sealing strip engageable by the margin of the door. Only the central post 1 is shown in detail in the drawing and this differs from the side posts only in that it is provided with two channels carrying rubber or other sealing strips 2 for sealing engagement with the adjacent ends of the pair of doors. The part to engage this sealing strip may consist of a lateral flange 3 formed as a part of the rearmost door panel 4 and spaced inwardly a slight distance from the edge of the forward door panel 5. The panel 5 preferably is in the form of a flat sheet secured as by means of rivets 6 to the rim of the panel 4 which is preferably a sheet metal pan-shaped pressing. The two panels combine to acord a hollow door structure in which is enclosed and protected from injury the door latching mechanism located adjacent the lower or swinging edge of the door.

As a part of the door lock there is shown a fixed bracket 7 riveted or otherwise secured interiorly and centrally of the front panel 5 with which cooperates a removable cap piece 8 secured by bolts 9 and accessible through an inspection opening 10 in the rear panel 4. Rotatably mounted in the bracket 7 is a worm 11 and a gear 12 having their axes at right angles to each other. The opposite sides of the gear 12 are provided with reduced extensions 13 and 14 revolubly mounted within shouldered recesses of the bracket 7 and its cap piece 8. The extension 14 has formed therein, in line with an opening 15 in the panel 5, a recess 16 squared or otherwise shaped to receive a correspondingly shaped key of a removable operating handle, to be carried by the vehicle operator and preclude unauthorized access to the baggage compartment. The worm 11 to be driven by the gear 12, has extending outwardly therefrom a pair of oppositely disposed extensions or sleeves 17 provided interiorly thereof with right and left-handed screw threads, respectively. Each sleeve 17 is threadedly engaged with an adjacent end of a reciprocating rod or link 18 which extends toward the side edge of the door where its opposite end is secured by a pin 19 between a pair of ears 20 which together form one leg of a bell crank lever pivoted on a pin 21 which is carried by a fixed bracket 22 riveted or otherwise secured to the door panels. The other leg 23 of the bell crank lever is adapted to be swung outwardly through an opening in the panel 4 into engagement with the rear face of one of the body posts upon proper manipulation of the worm and gear.

Upon insertion of the operating key into the recess 16 the gear 12 may be rotated for actuating the worm 11. Through its threaded engagement with the rods 18 the rods are thus shifted axially to swing the bell crank levers in unison. Because of the threaded connection the bell crank arm 23 may be swung from the dotted line position shown in Figure 2 to the full line position illustrated, engaging the rear face of the body post and exerting a very powerful force to close the door tightly and hold it against accidental or unauthorized opening. Inasmuch as the door is drawn up tightly by this mechanism it cooperates with the side wall paneling in presenting a smooth and finished appearance to the vehicle and lends structural strength to the side wall structure.

I claim:

1. In a motor vehicle having a baggage compartment accessible through an opening in the body wall and a door for said opening, the combination of a bracket mounted interiorly of the door, a gear and a worm supported by said bracket in meshed engagement, said gear having a key engaging formation thereon in line with an opening in the door to receive a removable operating key, and said worm having oppositely disposed axial extensions, a non-rotatable link threadedly engaged with each extension for the reciprocation thereof upon worm rotation and a bell crank lever pivoted to the door with one arm joined to the link for moving the other arm into or out of door latching position.

2. In a motor vehicle body having a baggage compartment with a loading opening in the body wall provided with a pair of doors for said opening arranged side by side, a body post extending across said opening at the adjacent sides of said doors and sealing means carried by the front face of the post for engagement by the doors and latch engaging surfaces on the rear face of said post, the combination of a bell crank lever pivoted interiorly of each door with one leg thereof adapted for engagement with said rear face of the post, an axially movable rod joined to the other arm of the lever, a rotatable gear member threadedly engageable with said rod to shift the same, separable bracket sections mounted interiorly of the door for supporting said member rotatably and a gear also supported rotatably in said bracket sections in operative engagement with said member, said gear having a key formation alined with an opening in the door to receive a removable operating key.

3. In a motor vehicle body having a baggage compartment with a loading opening in the body wall, and a closure door for the opening, the combination of a pair of relatively movable members located interiorly of the door and arranged end to end with the adjacent ends in threaded engagement, a movable latching device joined to the remote end of one of said members and adapted to hold said member against rotation, means mounting the other member for rotation, worm gearing formations on the last mentioned member and driving means having worm gearing formations in mating engagement with the worm gearing formations on the rotatable member.

DWIGHT E. AUSTIN.